United States Patent
Chung et al.

(10) Patent No.: US 9,760,083 B2
(45) Date of Patent: Sep. 12, 2017

(54) APPARATUS AND METHOD FOR DETECTING DAMAGE TO TOOL IN MACHINE

(75) Inventors: Dae Hyuk Chung, Gyeongsangnam-do (KR); Dae Jung Sung, Gyeongsangnam-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 483 days.

(21) Appl. No.: 13/992,417

(22) PCT Filed: Nov. 1, 2011

(86) PCT No.: PCT/KR2011/008247
§ 371 (c)(1),
(2), (4) Date: Jun. 7, 2013

(87) PCT Pub. No.: WO2012/077911
PCT Pub. Date: Jun. 14, 2012

(65) Prior Publication Data
US 2013/0253670 A1    Sep. 26, 2013

(30) Foreign Application Priority Data
Dec. 9, 2010  (KR) .......... 10-2010-0125500

(51) Int. Cl.
G05B 19/4065    (2006.01)
B23Q 17/09    (2006.01)

(52) U.S. Cl.
CPC ..... *G05B 19/4065* (2013.01); *B23Q 17/0961* (2013.01)

(58) Field of Classification Search
CPC .......... G05B 19/4065; B23Q 17/0961
USPC .................................... 700/79, 175
See application file for complete search history.

(56) References Cited

U.S. PATENT DOCUMENTS

| | | | | | |
|---|---|---|---|---|---|
| 3,548,172 | A | * | 12/1970 | Idelsohn | G05B 19/4163 318/561 |
| 3,679,955 | A | * | 7/1972 | Rhoades | G05B 19/371 318/572 |
| 3,764,786 | A | * | 10/1973 | Vawter | G05B 19/251 318/572 |

(Continued)

FOREIGN PATENT DOCUMENTS

| | | | | |
|---|---|---|---|---|
| EP | 0666138 B1 | * | 6/2001 | ......... G05B 19/4065 |
| JP | 11-296214 A | | 10/1999 | |

(Continued)

OTHER PUBLICATIONS

Kamron, 2007, "A Simple Expression for Multivariate Lagrange Interpolation", p. 1-9.*

(Continued)

*Primary Examiner* — Christopher E Everett
*Assistant Examiner* — Michael J Huntley
(74) *Attorney, Agent, or Firm* — John D. Veldhuis-Kroeze; Westman, Champlin & Koehler, P.A.

(57) ABSTRACT

The apparatus for detecting damage to the tool in the machine and the method of detecting damage to the tool according to the present disclosure are applied to a machine, such as a CNC, to detect and control damage to a tool and possibility of damage in advance, thereby efficiently managing processing work by the machine while achieving safety of the machine.

10 Claims, 4 Drawing Sheets

(56) References Cited

U.S. PATENT DOCUMENTS

| | | | | | |
|---|---|---|---|---|---|
| 4,559,600 | A | * | 12/1985 | Rao | G05B 19/4163 340/680 |
| 4,802,095 | A | * | 1/1989 | Jeppsson | B23Q 17/09 318/572 |
| 4,802,274 | A | * | 2/1989 | Petrof | B23Q 11/04 340/680 |
| 5,204,599 | A | * | 4/1993 | Hohn | G05B 19/4103 318/571 |
| 5,568,028 | A | * | 10/1996 | Uchiyama | G05B 19/4065 318/433 |
| 5,871,391 | A | * | 2/1999 | Pryor | F02F 1/24 356/600 |
| 6,202,002 | B1 | * | 3/2001 | Fainstein | G05B 19/4065 318/568.1 |
| 6,266,572 | B1 | * | 7/2001 | Yamazaki | G05B 19/4069 700/159 |
| 6,438,445 | B1 | * | 8/2002 | Yoshida | G05B 19/40932 700/173 |
| 6,615,103 | B2 | * | 9/2003 | Fujishima | B23Q 41/08 318/566 |
| 6,859,680 | B2 | * | 2/2005 | Fujita | G05B 19/4065 408/6 |
| 7,010,386 | B2 | * | 3/2006 | McDonnell | G05B 19/4065 340/679 |
| 7,301,737 | B2 | * | 11/2007 | Shima | H02P 21/0035 318/432 |
| 7,684,891 | B2 | * | 3/2010 | Okrongli | G05B 19/4083 234/13 |
| 8,725,283 | B2 | * | 5/2014 | Gray | G05B 19/4069 700/103 |
| 9,073,213 | B2 | * | 7/2015 | Nakata | B25J 9/1674 |
| 2003/0163286 | A1 | * | 8/2003 | Yasugi | G05B 19/4065 702/185 |
| 2003/0191553 | A1 | * | 10/2003 | Isohata | G05B 19/4142 700/170 |
| 2004/0174130 | A1 | * | 9/2004 | Inoue | B23Q 17/09 318/569 |
| 2005/0154488 | A1 | * | 7/2005 | Esterling | G05B 19/4065 700/175 |
| 2006/0142893 | A1 | * | 6/2006 | Yasugi | B23Q 17/09 700/174 |
| 2006/0255759 | A1 | * | 11/2006 | Takeuchi | G05B 19/404 318/574 |
| 2007/0016325 | A1 | * | 1/2007 | Esterling | B23Q 17/0961 700/175 |
| 2007/0255471 | A1 | * | 11/2007 | Wallis | G01M 13/025 701/62 |
| 2008/0105094 | A1 | * | 5/2008 | McMurtry | B23Q 15/12 82/118 |
| 2010/0253647 | A1 | * | 10/2010 | Agari | G06F 3/044 345/174 |
| 2013/0178973 | A1 | * | 7/2013 | Fromentin | G05B 19/401 700/173 |
| 2013/0304248 | A1 | * | 11/2013 | Lange | G05B 19/18 700/175 |

FOREIGN PATENT DOCUMENTS

| | | | |
|---|---|---|---|
| JP | EP 0666138 A1 * | 6/2001 | G05B 19/4065 |
| JP | 2004-126956 A | 4/2004 | |
| JP | 2004130407 A | 4/2004 | |
| JP | 2006-031122 A | 2/2006 | |
| KR | 10-0270217 | 10/2000 | |
| KR | 10-2001-0032067 A | 4/2001 | |
| KR | 10-0428413 | 8/2004 | |

OTHER PUBLICATIONS

Search Report dated Jun. 21, 2012 and written in Korean with English translation attached for International Patent Application No. PCT/KR2011/008247 filed Nov. 1, 2011, 5 pages.

Korean Office Action dated Aug. 29, 2016 for Korean Application No. 10-2010-0125500, 5 pages.

* cited by examiner

| PORT # | MATERIAL OF WORKPIECE | PROCESSING CONDITION | | TORQUE(Nm) | |
|---|---|---|---|---|---|
| | | DEPTH OF CUT (mm) | FEED (mm/tooth) | MAX | MIN |
| 1 | STS304 | 2 | 0.1 | 640 | 620 |
| | | 3 | 0.1 | 840 | 800 |
| | | 1 | 0.3 | 920 | 850 |
| | SM45C | 1 | 0.3 | 710 | 650 |
| | | 1 | 0.2 | 610 | 580 |
| 2 | SM20C | 2 | 0.1 | 715 | 790 |
| 3 | SM45C | 3 | 0.1 | 550 | 500 |
| | | 1 | 0.2 | 620 | 610 |
| | | 2 | 0.2 | 560 | 530 |
| | | 1 | 0.1 | 450 | 410 |

APPARATUS AND METHOD FOR DETECTING DAMAGE TO TOOL IN MACHINE

CROSS-REFERENCE TO RELATED APPLICATION

This Application is a Section 371 National Stage Application of International Application No. PCT/KR2011/008247, filed Nov. 1, 2011 and published, not in English, as WO2012/077911 on Jun. 14, 2012.

FIELD OF THE DISCLOSURE

The present disclosure relates to an apparatus for detecting damage to a tool of a machine capable of continuously performing processing work by making a control so as to maintain numerical accuracy and also prevent damage to a tool by detecting a damage possibility of the tool in advance when precisely machining a workpiece by using the machine, especially, a CNC machine, and a method of detecting damage to a tool by the same.

BACKGROUND OF THE DISCLOSURE

In general, a tool installed and used in a machine gradually incurs abrasion according to cutting machining to be finally damaged. The abrasion of the tool degrades quality of a processed surface, as well as numerical accuracy of a workpiece, and accidental damage of the tool may damage the workpiece. The aforementioned abrasion and damage of the tool may create monetary loss due to damage to the existing workpiece, and especially, is one of the primary causes of why unmanned processing is difficult in a CNC machine.

In order to solve the aforementioned problem, a tool lifespan management function has been recently developed to check a tool use time and automatically exchanges a tool in accordance with a predetermined use time. However, such a method is a method applicable to a case where a tool is used only under a specific processing condition in a mass production method, and is not applicable to a case where a different shape of component is processed each time.

In order to solve the problem, a technique of monitoring damage of a tool itself based on various measuring methods, such as an acoustic sensor, a cutting force sensor, and an image sensor is suggested.

However, since the technique of monitoring damage of a tool has an application limitation in an aspect of practical use according to a requirement of an additional measuring device, a method of detecting current signals from a servo and a spindle configuring a machine and monitoring damage to a tool based on the detected current signals has been most realistically used.

US Patent Application Publication No. 20060142893 suggests a method of determining damage to a tool by monitoring torque used for cutting machining through current signals from a servo and a spindle and checking a change in the torque according to passage of time and momentary displacement of a torque.

US Patent Application Publication No. 20060142893 includes, in order to perform monitoring damage to a tool, a detecting means for detecting indexes for a plurality of machining cycles, a comparing means for comparing an index in a specific machining cycle with existing index values in order to determine damage to the tool, a storage means for storing threshold values meaning the damage to the tool, a display means for writing an initial threshold value in the storage means, updating means for updating the stored values of the thresholds together while performing processing, a means for discontinuing the updating the values of the thresholds, and a determining means for determining set values of the thresholds based on the stored values of the thresholds when the update of the values of the thresholds is discontinued.

The technique of US Patent Application Publication No. 20060142893 is a practically useful method in an aspect that it is possible to detect damage to a tool through a current signal which is easily obtained without an additional device in a machine, and an appropriate threshold value is calculated in accordance with a processing situation without individually storing the values of the thresholds by a user.

However, the method has a problem in that it is impossible to recognize whether a change in torque generated by a change in a tool slowly progressing with the passage of time, such as abrasion of a tool, is a change by tool abrasion or a change by a change in a processing condition, and further, it is impossible to recognize whether, in view of the change of the processing condition, the change in the torque is generated by damage to the tool or an actual change in the processing condition.

Due to the aforementioned problems, the technique of US Patent Application Publication No. 20060142893 is disadvantageously and limitedly applicable only to a case in which processing under a uniform condition is repeated, for example, drilling of milling machining and tapping processing.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

In order to solve the aforementioned problems in the related art, an object of the present disclosure is to provide an apparatus for detecting damage to a tool in a machine which predicts a processing condition, such as a depth of cut, a feed, and whether to use a coolant, to be performed by a tool manager mounted in a simulator and a numerical controller for 3-dimensional prediction based on cutting torque obtained from current of a servo and a spindle of the machine and prior interpolation coordinates and a range of torque to be generated in the future based on past torque information stored in the tool manager, and detects damage to the tool based on the prediction.

Further, the present disclosure provides a method of detecting damage to a tool which continuously performs processing work, stops processing or warns damage to the tool by detecting damage to a tool by applying a 3-dimensional simulator, a tool manager, and a tool DB based on torque obtained from a servo and a spindle by the apparatus for detecting damage to the tool in the machine and also changing a processing condition according to a detected situation.

In order to achieve the aforementioned objects, an aspect of the present disclosure provides an apparatus for detecting damage to a tool in a machine including: a detector 140 configured to receive a current signal according to torque from a servo 100 and a spindle 110 of a machine; a simulator 150 configured to calculate a prior processing condition by using information input from a numerical controller 120 of the machine; a tool DB 130 configured to store a torque value measured at the time of past processing and information on a processing condition through a currently mounted tool and a corresponding tool; a tool manager 160 configured to record the torque value measured at the time of the prior processing by the currently mounted tool and a corresponding tool and the information on the processing condition in the tool DB 130 or extracting information from the tool DB 130; a critical torque calculator 190 configured to receive information from the tool manager 160, and calculate a range of torque predicted to be generated during processing work by using the prior processing condition calculated by the simulator 150; a critical torque data storing unit 180 configured to store an upper limit value and a lower limit value of the torque predicted by the critical torque calculator 190; a comparator 170 configured to compare the torque measured by the detector 140 and a critical torque range from the critical torque calculator 190; and a controller 250 configured to control a processing operation of the machine according to a result of the comparison by the comparator 170.

Further, the machine processing operation controller 250 includes: a tool damage prevention unit 200 configured to control so that the machine is operated under an adjusted processing condition by controlling the machine to adjust a rotation speed or a feed of a workpiece so as to prevent abrasion of the tool from exceeding a predetermined value when measured torque approaches a threshold value within a first reference value; a tool damage prediction unit 210 configured to warn to a driver of the machine through an alarm means so as to allow the driver of the machine to take measures, such as replacing the tool or changing the processing condition when the measured torque approaches the threshold value within a second reference value smaller than the first reference value; and a tool damage detection unit 220 configured to stop the processing operation of the machine by controlling the numerical controller when the measured torque is out of the threshold value.

Further, the tool DB 140 sets port information of a tool magazine and a material of the workpiece as a pair of elements of reference information, and torque information actually measured under a processing condition, such as a depth of cut and a feed, for the pair of elements of reference information is stored as one set.

In the meantime, another aspect of the present disclosure suggests a method of detecting damage to a tool by using the aforementioned apparatus for detecting damage to the tool in the machine. The method of detecting damage to the tool according to the present disclosure includes steps of: (A) receiving a current signal according to torque from a servo 100 and a spindle 110 of a machine (S112); (B) calculating a prior processing condition by using information input from a numerical controller 120 of the machine (S105 and S106); (C) storing a torque value measured at the time of past processing by a currently mounted tool and a corresponding tool, and information on a processing condition (S101 and S102); (D) calculating a range and a threshold value of torque predicted to be generated during processing work by using the information stored in step (C) and the prior processing condition calculated in step (B), and storing the range and the threshold value of the torque (S107 to S111); (E) comparing the torque measured in step (A) with the range and the threshold value of the torque calculated in step (D) (S112); and (F) controlling a processing operation of the machine according to a result of the comparison in step (E) (S113 to S119).

Further, in step (F), a mode for controlling the processing operation includes a tool damage detection mode, a tool damage prevention mode, and a tool damage prediction mode.

In the tool damage prevention mode, when it is determined that the current torque detected in step (A) approaches a threshold value calculated in step (D) within a first reference value, an operation of the machine is controlled so that the processing condition, that is, a depth of cut and a feed, is changed, so as to prevent the tool from being damaged (S114 and S115).

In the tool damage prediction mode, when it is determined that the current torque detected in step (A) approaches the threshold value calculated in step (D) within a second reference value smaller than the first reference value, it is determined that there is a concern regarding generation of damage to the tool, so that a warning is generated through an alarm means (S116 and S117).

In the tool damage detection mode, when the current torque detected in step (A) exceeds the threshold value calculated in step (D), it is determined that the tool damage is generated, the machine is controlled so as to stop the operation of processing work so as to prevent the machine from being damaged (S118 and S119).

The apparatus for detecting damage to the tool in the machine according to the present disclosure has a characteristic of detecting or predicting damage to a tool based on torque obtained from a servo and a spindle like the existing disclosure, but also has an effect of predicting damage and finding a counterplan after the prediction, as well as simply detecting damage to a tool, by applying a 3-dimensional simulator, a tool manager, and a unique tool DB, instead of using a method of updating a threshold value of torque in time series in the existing disclosure, and an effect of achieving safe unmanned processing work.

Figure 1:
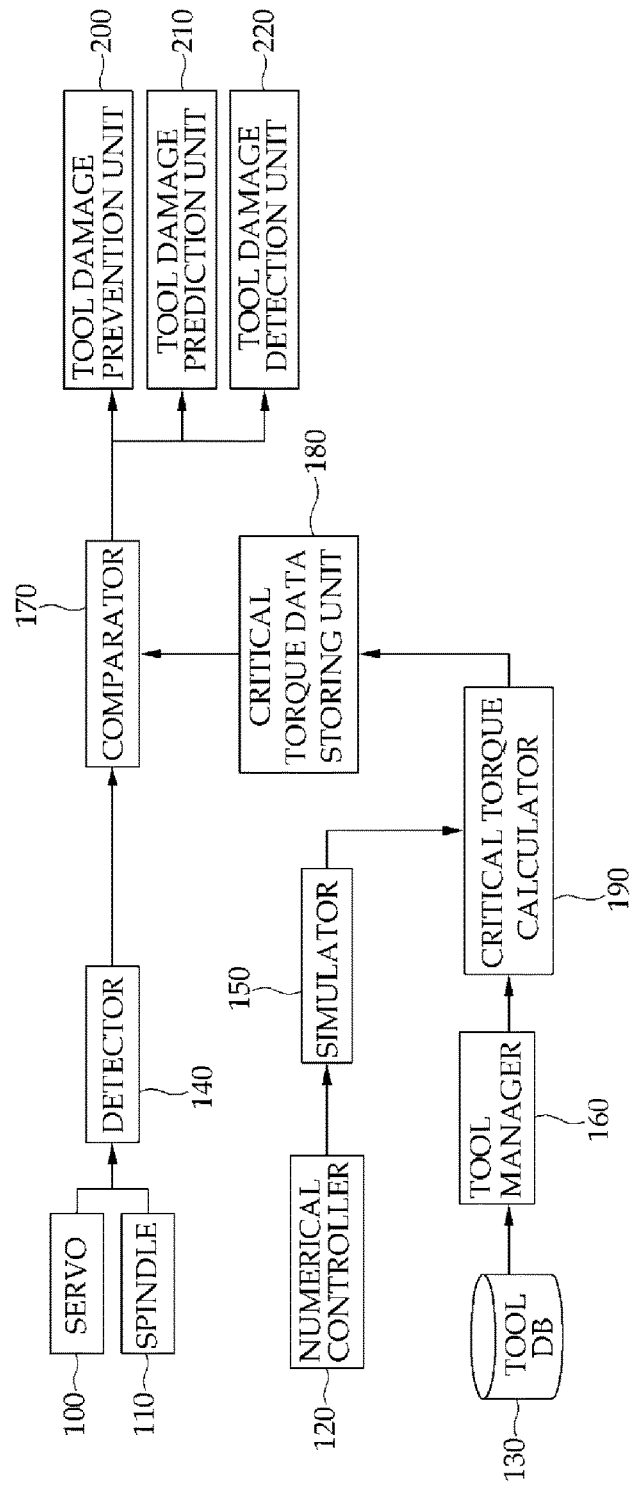
FIG. 1 is a block diagram schematically illustrating a configuration of an apparatus for detecting damage to a tool in a machine according to the present disclosure.

| Description of Main Reference Numerals of Drawings | |
|---|---|
| 100: Servo | 110: Spindle |
| 120: Numerical controller | 130: Tool DB |
| 140: Detector | 150: Simulator |
| 160: Tool manager | 170: Comparator |
| 180: Critical torque data storing unit | |
| 190: Critical torque calculator | |

DETAILED DESCRIPTION

Hereinafter, the present disclosure will be described in more detail with reference to the accompanying drawings illustrating the exemplary embodiment of the present disclosure.

As illustrated in a block diagram of FIG. 1, an apparatus for detecting damage to a tool in a machine according to the present disclosure includes: a detector 140 for receiving a current signal according to torque from a servo 100 and a spindle 110, a simulator for calculating a pre-processing condition by using information input from a numerical controller 120; a tool manager 160 for recording information on a currently mounted tool, a torque value measured during processing, a processing condition, and the like in a tool DB 130 or extracting the information from the tool DB 130, a critical torque calculator 190 for calculating a torque range to be predicted in the processing work by using the prior processing condition which is received from the tool manager 160 and calculated by the simulator 150, a comparator 170 for comparing the torque measured by the detector 140 and the critical torque range received from the critical torque calculator 190, and a controller 250 for controlling a processing operation of the machine according to a result of the comparison of the comparator 170.

The servo 100 and the spindle 110 rotating the tool or a workpiece, or moving a shaft maintain a uniform rotation speed and transfer speed regardless of a processing load through a current control, and accordingly, in a case where the processing load is increased, a quantity of current applied to the servo/spindle is increased, and the current signal is detected by the detector 140 in real time.

The detector 140 indirectly calculates torque actually generated by the servo/spindle by using the quantity of current applied to the servo/spindle, and serves to calculate a cutting load through the calculation, and the calculated torque is transferred to the comparator 170.

The numerical controller 120 adjusts a feed during the processing according to prior processing information input by a user for the workpiece, performs an additional function of the machine, such as setting axis coordinates at which the tool needs to be positioned after a predetermined time and turning on/off of cutting oil, and transfers the information to the simulator 150. Further, the machine is controlled by the machine processing operation controller 250 so that the feed information input as the prior processing information is ignored and the machine is operated under a changed processing condition in order to prevent the tool from being damaged in a case where the damage to the tool is expected, which will be described later.

The simulator 150 performs simulation in accordance with the axis coordinates received from the numerical controller 120 by using the information on the same workpiece and tool as those in the actual processing based on an actually measured machine model. In this case, the simulator performs the simulation on a situation after a predetermined specific time by using the prior processing information received from the numerical controller 120 based on a current time and the input information on the tool and the workpiece to be used in the processing work, and predicts a processing condition, such as information on a depth of cut and a width of cut of the tool, after the specific time. The information is transferred to the critical torque calculator 190 to be described below.

Figures 2, 3:
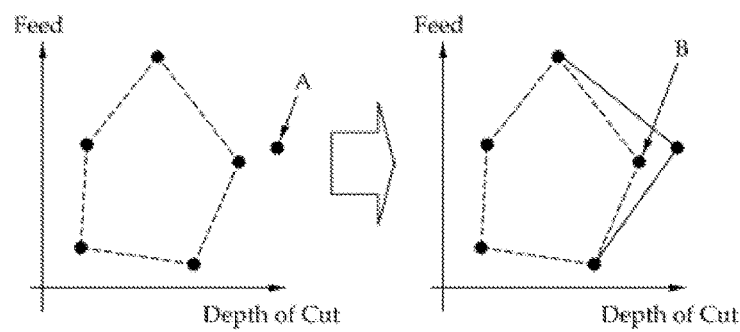
FIG. 2 is a table illustrating an example of a tool DB.
FIGS. 3 and 4 are diagrams illustrating examples of a method of adding a tool condition in the tool DB.

The tool DB 130 stores data about specific processing condition information generated in the past for a tool currently mounted in a machine and a range of torque generated under the specific processing condition as exemplarily represented in FIG. 2. In this case, the processing condition information includes a depth of cut, a feed (a feed rate per blade), a material of a workpiece, and the like which exert the largest influence on the torque, and a maximum value and a minimum value of the torque measured according to the processing condition are stored.

The configuration of the tool DB has a characteristic in that the tool DB is automatically configured by the tool manager 160 and the simulator 150. The tool DB sets port information of a tool magazine and a material of a workpiece as a pair of elements of reference information, and the torque information actually measured under various processing conditions, such as the depth of cut and the feed, for the pair of elements of reference information is stored as one set.

In the table of FIG. 2, a tool attached to port No. 1 has information that the tool processed a workpiece made of STS304 and SM45C in the past, and torque values for three processing conditions are stored in a case of STS304 and torque values for two processing conditions are stored in a case of SM45C. Further, for a tool attached to port No. 2, one prior processing condition for a workpiece made of SM20C and a torque value for the processing condition are stored, and for a tool attached to port No. 3, four prior processing conditions for a workpiece made of SM45C and torque values for the processing conditions are stored.

The processing conditions and the torque information are obtained from the past processing in which the tools attached to port Nos. 1, 2, and 3 were used, and the pair of processing condition and torque information stored in the tool DB is determined as described below.

A torque size is generally determined by cutting force generated during the processing and friction force between the tool and the workpiece, and the cutting force is increased in proportion to a cross sectional area of the chip. This means that as the depth of cut and the feed are increased in turning, torque is increased, and such tendency was proven through a prior experiment and a thesis. However, there are several factors for determining the torque in addition to the processing condition, and a model accurately establishing a relationship between the factors and the torque is not present.

In the present disclosure, considering this fact, the prediction of the torque is performed by interpolation of prior data. Accordingly, an addition of the processing condition is performed in a direction of widening an area in which the interpolation is available, and a detailed method thereof will be described below.

Figure 4:
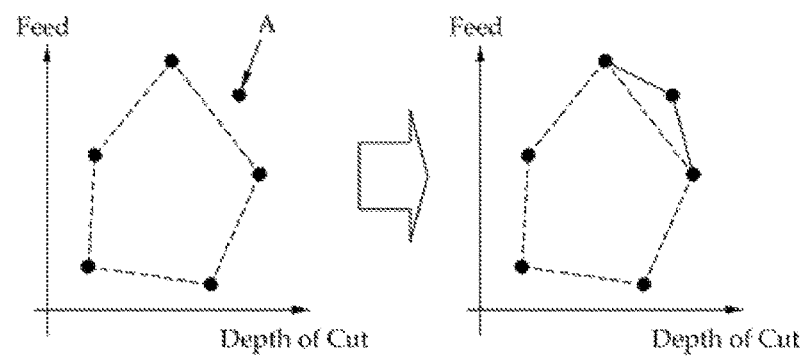

A processing condition area in which the interpolation of the torque is available may be defined as a convex area having a convex shape illustrated in FIGS. 3 and 4 having a minimum size including the processing conditions, and the convex area having the minimum size is formed by positioning the processing conditions at corners or boundary surfaces of the convex area. Based on this, in a case where a new processing condition is positioned outside the convex area of the existing processing conditions, the processing condition area is expanded by the interpolation of the torque, and in a case where the existing processing condition is included in the newly expanded processing condition area, the existing processing condition is deleted.

For this, a process of adding the processing condition for a depth of cut, a feed, and the like, will be additionally described with reference to FIGS. 3 and 4. Processing condition A in FIG. 3 is included in an area in which the torque may not be recognized by interpolating the existing processing condition stored in the tool DB, so that in this case, a range of the processing condition needs to be expanded, and in this case, an area connecting the existing processing conditions stored in the tool DB is formed to have a convex shape. In FIG. 3, processing condition B is present in a newly expanded processing condition area (an area indicated with a solid line) after the addition of processing condition A, and processing condition B is deleted.

However, in a case of FIG. 4, new processing condition A is added, but processing condition A configures the processing condition area having a convex shape together with the existing processing conditions, so that the existing processing conditions are maintained as they are.

The critical torque calculator 190 serves to receive the processing condition information, such as the depth of cut and the feed, as an input from the simulator 150, configure the information in the tool DB as a torque map expressed on three axis coordinates for the depth of cut and the feed, and the torque according to the depth of cut and the feed, and then predict torque corresponding to the processing condition.

Figure 5:
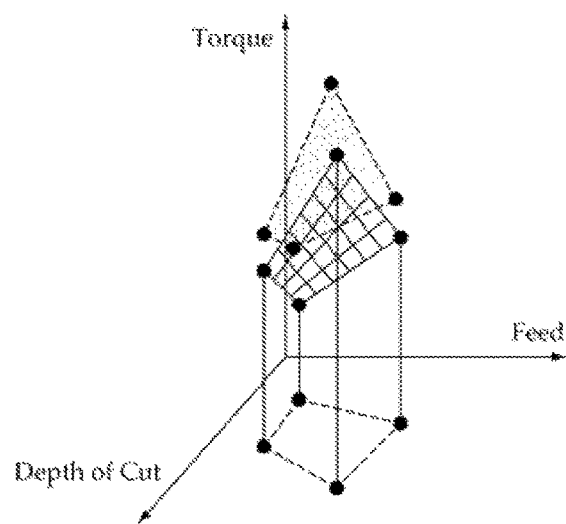
FIG. 5 is a torque map according to a processing condition of a specific tool stored in the tool DB.

FIG. 5 illustrates an example of a torque map made by the critical torque calculator 190. The torque map includes an upper torque map formed of an upper limit value of the measured torque and a lower torque map formed of a lower limit value of the measured torque.

The critical torque data storing unit 180 stores the upper limit value and the lower limit value of the torque predicted by the critical torque calculator 190.

The comparator 170 sets a threshold value serving as an appropriate determination reference for checking a situation desired by a user, such as detection, prediction, or prevention of damage to the tool, based on the upper limit value and the lower limit value of the torque stored in the critical torque data storing unit 180, performs a function of comparing the set threshold value with the torque information transferred from the detector 140, and outputs a signal to the machine processing operation controller, which is to be described below, according to any one mode among tool damage/prevention/prediction modes which are predetermined in the comparator according to a result of the comparison.

The machine processing operation controller 250 includes a tool damage prevention unit 200, a tool damage prediction unit 210, and a tool damage detection unit 220 so as to control the machine according to a user mode determined according to the torque information result compared by the comparator 170.

In a case where the measured torque approaches the threshold value within a first reference value, the tool damage prevention unit 200 allows the machine to be operated under an adjusted processing condition by controlling the machine so that a rotation speed or a feed of the workpiece is adjusted so as to prevent abrasion of the tool from exceeding a predetermined value, thereby performing safe unmanned processing work.

In a case where the measured torque approaches the threshold value within a second reference value smaller than the first reference value, the tool damage prediction unit 210 serves to notify a machine driver of the fact by a method, such as an alarm or turning on an emergency light, thereby enabling the driver to take measures, such as replacing the tool or changing the processing condition.

Further, in a case where the measured torque is out of the threshold value, that is, the tool is damaged, the tool damage detection unit 220 stops the processing operation by controlling the numerical controller.

Figure 6:
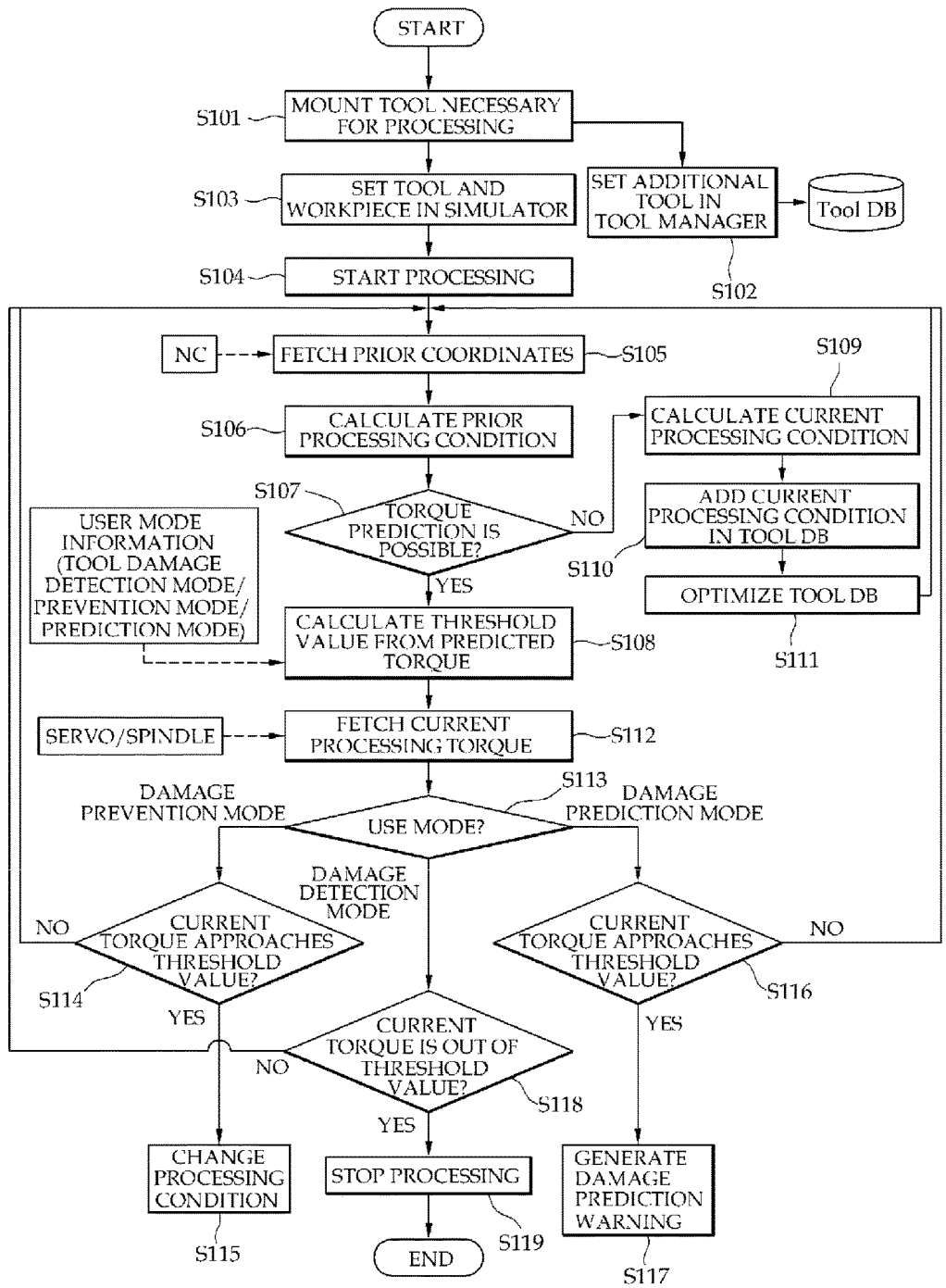
FIG. 6 is a flowchart for a method of detecting damage to a tool according to the present disclosure.

Hereinafter, a method of detecting damage to a tool by the apparatus for detecting the damage to the tool in the machine according to the present disclosure will be described through a flowchart illustrated in FIG. 6.

A tool necessary for processing is mounted in a port provided at a tool magazine in step S101, and information on the tool added to the tool manager 160 is input and the information on the added tool is stored in the tool DB in step S102. The information on the tool and a workpiece is input in the simulator 150 in step S103, and processing work starts in step S104.

The simulator 150 fetches prior coordinates for the processing work input in the numerical controller 120 in step S105, and calculates a prior processing condition in step S106.

The comparator 170 determines whether torque to be generated under the prior processing condition belongs to a predictable range by comparing a result of the calculation of the torque to be generated during the processing work obtained by the critical torque calculator 190 with data stored in the critical torque data storing unit 180 according to the prior processing condition calculated in step S106 in step S107, and when the torque to be generated under the prior processing condition belongs to the predictable range, the comparator 170 calculates a threshold value from the predicted torque in step S108.

When it is determined that the predicted torque does not belong to the predictable range in step S107, a current processing condition is calculated in step S109, the current processing condition is added to the tool DB in step S110, the tool DB is optimized in step S111, and the process returns to step S105.

Next to step S108, the comparator 170 fetches the current processing torque in the servo 100 and the spindle 110 detected by the detector 140 in step S112, and determines a mode among predetermined user modes, that is, tool damage detection/prevention/prediction modes, to which the current processing torque corresponds, by comparing the current processing torque with the upper limit value and the lower limit value of the torque stored in the critical torque data storing unit 180 in step S113.

In the tool damage prevention mode, when it is determined that the current torque detected by the detector 140 approaches a threshold value within a first reference value in step S114, an operation of the machine is controlled so that the processing condition, that is, a depth of cut and a feed are decreased, by the tool damage prevention unit 200 of the machine operation controller 250 so as to prevent the tool from being damaged in step S115, and when the current torque does not approach the threshold value, the process returns to step S104.

In the tool damage prediction mode, when it is determined that the current torque detected by the detector 140 approaches the threshold value within a second reference value smaller than the first reference value in step S116, it is determined that there is a concern regarding the generation of damage to the tool, so that a warning is generated through an alarm means, such as a buzzer or a warning light, by the tool damage prediction unit 210 in step S117, and when the current torque does not approach the threshold value, the process returns to step S104.

In the tool damage detection mode, when the current torque detected by the detector 140 exceeds the threshold value, it is determined that the tool damage is generated, and the machine is controlled so as to stop the operation of the processing work by the tool damage detection unit 220 of the machine processing operation controller 250 so as to prevent the machine from being damaged in step S114, and the process is terminated. When the current torque is not out of the threshold value, the process returns to the processing start step S104.

It will be understood that the present disclosure is not limited to the exemplary embodiment, and may be modified by those skilled in the art within the scope of the technical spirit of the disclosure defined in the appended claims.

The apparatus for detecting damage to the tool in the machine and the method of detecting damage to the tool according to the present disclosure are applied to a machine, such as a CNC, to detect and control damage to a tool and possibility of damage in advance, thereby efficiently managing processing work by the machine while achieving safety of the machine.

Although the present disclosure has been described with reference to exemplary and preferred embodiments, workers skilled in the art will recognize that changes may be made in form and detail without departing from the spirit and scope of the disclosure.

The invention claimed is:

1. An apparatus for detecting damage to a tool in a machine capable of continuously performing processing work by maintaining numerical accuracy and preventing damage to the tool, comprising:
   a detector configured to receive a signal according to torque from a servo and a spindle of a machine;
   a simulator configured to calculate a prior processing condition by using information inputted from a numerical controller of the machine,
   wherein the information inputted from the numerical controller includes a three-dimensional prediction based on the torque obtained from the signal received by the detector, prior corresponding coordinates based on an interpolation, and a predicted range of torque based on past corresponding torque information,
   wherein the prior processing condition includes at least one of a depth of cut, a feed, and a material of a workpiece;
   a critical torque calculator configured to calculate the predicted range of torque by using an interpolation of the prior processing condition calculated by the simulator, wherein an addition of the prior processing condition is performed in a direction of widening an area in which the interpolation is available;
   a critical torque data storing unit configured to store an upper limit value and a lower limit value of the predicted range of torque calculated by the critical torque calculator;
   a comparator configured to compare the torque indicated by the signal received by the detector and the predicted range of torque calculated by the critical torque calculator; and
   a machine processing operation controller configured to control a processing operation of the machine according to a result of the comparison by the comparator,
   wherein the machine processing operation controller comprises:
      a tool damage prevention unit configured to adjust rotation speed or a feed of a workpiece of the machine so as to limit abrasion of the workpiece, according to the result of the comparison by the comparator; and
      a tool damage prediction unit configured to communicate a warning signal to an operator of the machine through an alarm means according to the result of the comparison by the comparator.

2. The apparatus of claim 1, wherein the machine processing operation controller further comprises:
   a tool damage detection unit configured to stop the processing operation of the machine by controlling the numerical controller according to the result of the comparison by the comparator.

3. The apparatus of claim 1, further comprising a tool database configured to set port information of a tool magazine and a material of the workpiece as a pair of elements of reference information, and torque information detected by the detector.

4. The apparatus of claim 1, wherein the area in which the interpolation is available includes a convex area associated with known processing conditions, the convex area having a convex shape having a minimum size and including the prior processing condition, and the convex area being formed by positioning the prior processing condition at a corner or a boundary surface of the convex area.

5. The apparatus of claim 4, wherein the critical torque calculator is configured such that:
   when a new processing condition is positioned outside of the convex area, the critical torque calculator expands the convex area by the interpolation of the predicted range of torque.

6. The apparatus of claim 5, wherein the critical torque calculator is configured such that when an existing processing condition is included in a newly expanded convex area, the critical torque calculator deletes the existing processing condition.

7. A method of detecting damage to a tool in a machine capable of continuously performing processing work by maintaining numerical accuracy and preventing damage to the tool, comprising the steps of:
   (A) receiving a signal according to torque from a servo and a spindle of a machine;
   (B) calculating a prior processing condition by using information inputted from a numerical controller of the machine,
   wherein the information inputted from the numerical controller includes a three-dimensional prediction based on the torque obtained from the received signal, prior corresponding coordinates based on an interpolation, and a predicted range of torque based on past corresponding torque information, and
   wherein the prior processing condition includes at least one of a depth of cut, a feed, and a material of a workpiece;
   (C) adding a new tool to be used in processing and setting tool information;
   (D) calculating a range and a threshold value of torque predicted to be generated during processing work by using the information stored in step (C) and the prior corresponding coordinates based on the interpolation from step (B), and storing the range and the threshold value of the torque, wherein an addition of the prior processing condition is performed in a direction of widening an area in which the interpolation is available;
   (E) comparing the torque indicated in the signal received in step (A) with the range and the threshold value calculated in step (D); and
   (F) controlling a processing operation of the machine according to a result of the comparison in step (E),
   wherein in step (F), a mode for controlling the processing operation includes a tool damage detection mode, a tool damage prevention mode, and a tool damage prediction mode, and
      in the tool damage prevention mode, when it is determined that the torque indicated in the signal received in step (A) approaches the threshold value calculated in step (D) within a first reference value, an operation of the machine is controlled so that a processing condition of the processing operation is changed so as to limit damage to the tool;

in the tool damage prediction mode, when it is determined that the torque indicated in the signal received in step (A) approaches the threshold value calculated in step (D) within a second reference value smaller than the first reference value, communicating a warning signal to an operator of the machine through an alarm means according to the comparison in step (E); and in the tool damage detection mode, when the torque indicated in the signal received in step (A) exceeds the threshold value calculated in step (D), the process operation of the machine is stopped so as to limit damage to the machine.

8. The method of claim 7, wherein the area in which the interpolation is available includes a convex area associated with known processing conditions, the convex area having a convex shape having a minimum size and including the prior processing condition, and the convex area being formed by positioning the prior processing condition at a corner or a boundary surface of the convex area.

9. The method of claim 8, wherein when a new processing condition is positioned outside of the convex area, the convex area is expanded by the interpolation of the predicted range of torque.

10. The method of claim 9, further comprising wherein when an existing processing condition is included in a newly expanded convex area, the existing processing condition is deleted.

* * * * *